US009047271B1

(12) United States Patent
Mengibar et al.

(10) Patent No.: US 9,047,271 B1
(45) Date of Patent: Jun. 2, 2015

(54) MINING DATA FOR NATURAL LANGUAGE SYSTEM

(71) Applicant: Google Inc., Mountain View, CA (US)

(72) Inventors: Pedro J. Moreno Mengibar, Jersey City, NJ (US); Mark Edward Epstein, Katonah, NY (US); Fadi Biadsy, New York, NY (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 13/780,757

(22) Filed: Feb. 28, 2013

(51) Int. Cl.
*G06F 17/27* (2006.01)
*G06F 17/28* (2006.01)

(52) U.S. Cl.
CPC ...................................... *G06F 17/28* (2013.01)

(58) Field of Classification Search
None
See application file for complete search history.

(56) References Cited

U.S. PATENT DOCUMENTS

| 5,212,821 | A | 5/1993 | Gorin et al. | |
|---|---|---|---|---|
| 5,797,123 | A | 8/1998 | Chou et al. | |
| 8,682,647 | B1 * | 3/2014 | Lee | 704/9 |
| 2006/0190261 | A1 | 8/2006 | Wang | |
| 2008/0059150 | A1 * | 3/2008 | Wolfel | 704/9 |
| 2010/0274552 | A1 * | 10/2010 | Gao et al. | 704/2 |
| 2012/0290509 | A1 | 11/2012 | Heck et al. | |
| 2012/0303358 | A1 * | 11/2012 | Ducatel et al. | 704/9 |
| 2013/0173610 | A1 * | 7/2013 | Hu et al. | 707/728 |

FOREIGN PATENT DOCUMENTS

| EP | 834862 A2 | 4/1998 |
|---|---|---|
| WO | WO0014727 A1 | 3/2000 |

OTHER PUBLICATIONS

Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng__ASRU2001__NLU.pdf.

Lehuen et al., "A Robust Semantic Parser Designed for Spoken Dialog Systems" in 2010 IEEE Fourth International Conference on Semantic Computing (ICSC), 2010, pp. 52-55.

Gorin et al., "An Experiment in Spoken Language Acquisition", IEEE Transactions on Speech and Audio Processing, 2 (1)(II), 1994, pp. 224-240.

(Continued)

*Primary Examiner* — Jeremiah Bryar
(74) *Attorney, Agent, or Firm* — Fish & Richardson P.C

(57) ABSTRACT

A method iteratively processes data for a set of actions, including: for each action: accessing a corresponding set of command sentences for the action, determining first n-grams that are semantically relevant for the action and second n-grams that are semantically irrelevant for the action, and identifying, from a log of command sentences that includes command sentences not included in the corresponding set of command sentences, candidate command sentences that include one first n-gram and a third n-gram that has not yet been determined to be a first n-gram or a second n-gram; for each candidate command sentence, determining each third n-gram that is semantically relevant for an action to be a first n-gram, and determining each third n-gram that is semantically irrelevant for an action to be a second n-gram, and adjusting the corresponding set of command sentences for each action based on the first n-grams and the second n-grams.

18 Claims, 4 Drawing Sheets

(56) References Cited

OTHER PUBLICATIONS

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

Chen et al., "Diverse Topic Phrase Extraction from Text Collection" WWW 2006, 9 pages.

Bonino et al., "Dynamic Optimization of Semantic Annotation Relevance" in Evolutionary Computation CEC2004, Congress on Evolutionary Computation, 2004, pp. 1301-1308.

Wu et al., "KIP: A Keyphrase Identification Program with Learning Functions" in Proceedings of the International Conference on Information Technology: Coding and Computing (ITCC'04), vol. 2, 5 pages.

Krulwich et al., "Learning user information interests through the extraction of semantically significant phrases" AAAI Technology Report SS-96-05, Compilation, pp. 110-112.

Gupta et al., "Segmenting Spoken Language Utterances Into Clauses for Semantic Classification" in Automatic Speech Recognition and Understanding (ASRU 2003), 2003 IEEE Workshop, pp. 525-530.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cm.edu/~ananlada/SemanticRoleLabelingASRU05.pdf.

Kawahara et al., "Topic Independent Language Model for Key-Phrase Detection and Verification", Acoustics, Speech, and Signal Processing, 1999, 1999 IEEE International Conference, pp. 685-688.

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.

\* cited by examiner

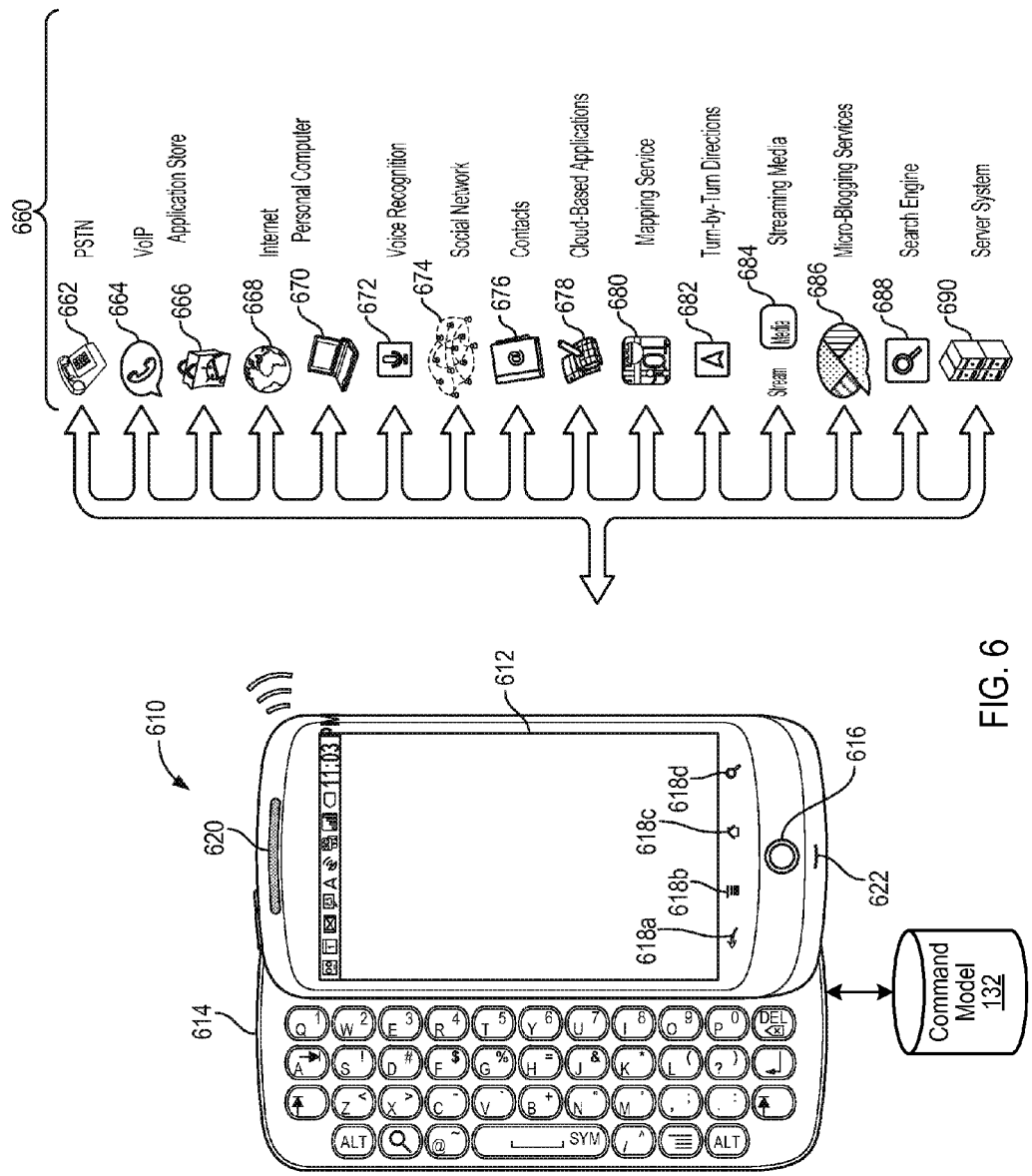

MINING DATA FOR NATURAL LANGUAGE SYSTEM

BACKGROUND

This specification relates to speech recognition and speech understanding systems.

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

A user device uses a speech recognition processing system to recognize and process speech commands. A provider of the speech recognition and processing system trains the system on examples of the various commands he/she will speak. The training of the speech recognition and processing system is resource intensive.

SUMMARY

In general, one innovative aspect of the subject matter described in this specification can be embodied in methods that include the actions of accessing data specifying a set of actions, each action defining a user device operation that is different from user device operations for each other action; iteratively processing data for the set of actions until a convergence condition is met, the iterative processing comprising: for each action, accessing a corresponding set of command sentences for the action; for each action, determining first n-grams that are semantically relevant for the action and second n-grams that are semantically irrelevant for the action in the correspond set of command sentences; for each action, identifying, from a log of command sentences that includes command sentences not included in the corresponding set of command sentences, candidate command sentences that include at least one first n-gram and a third n-gram that has not yet been determined to be a first n-gram or a second n-gram; for each candidate command sentence, determining each third n-gram that is semantically relevant for an action to be a first n-gram, and determining each third n-gram that is semantically irrelevant for an action to be a second n-gram; and for each action, adjusting the corresponding set of command sentences for the action based on the first n-grams and the second n-grams; and in response to the convergence condition being met, persisting in a computer memory device, for each action, the corresponding set of command sentences. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The process requires only a relative small number of speech command samples from a speech log to begin the training process, and thus obviates the need to collect a large number of examples from people skilled in semantic understanding technologies. The process can utilize voice command logs to begin the training process, and requires only a relative small number of voice commands for each specified action for which the system is being trained. Developers, by use of the system, can also use example sentences, rather than grammars, to begin the training process, thereby reducing the complexities and constraints inherent with the use of grammars. Thus, the use of predetermined prefixes and suffixes is not needed, as new features emerge during the iterative training process. Furthermore, by extracting useful examples from logs of actual voice commands, the system learns from real examples rather than grammars or commands crafted from linguists. This improves the quality of the natural language system and makes the development of such systems much easier for developers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a block diagram of an example mobile computing device.

Like reference numbers and designations in the various drawings indicate like elements.

DETAILED DESCRIPTION

A system utilizes an iterative process of collecting training data from logs to build a speech recognition language model and speech understanding system. The iterative process may, in some implementations, be semi-supervised. The system requires only a small number of command sentences for each action of a set of different actions to begin the process.

The system implements an iterative process that learns a semantic "kernel" of relevant words for each action, and also irrelevant words for each action, starting from a small seed of command sentences for each action. Using the command sentences and the determined first and second n-grams, the system mines command logs for additional sentences that match the existing sentences and include an "insertion." The system, using the sentences that include the insertion (also referred to as a "third n-gram"), learns whether the n-gram of the insertion is likely relevant or irrelevant by examining its usage across all sentences for all actions. If the word is relevant for an action, it is identified as a first n-gram for the action. If the word is not relevant for the action, then it is identified as a second n-gram for the action.

During each iteration, a subset of the mined sentences is selected and added to the training data. The highest scoring N semantically irrelevant words and the highest scoring M semantically relevant words for each action are identified. In some implementations, sentences with these words are displayed to a rater, and the rater accepts or rejects the sentence as a valid command for a specified action. In other implementations, the sentences are automatically selected by the system using an appropriate selection process. The accepted sentences are added to the training set, and the process is repeated until a convergence condition (e.g., max number of iterations, rater indicates the training is complete) occurs.

Figure 1:
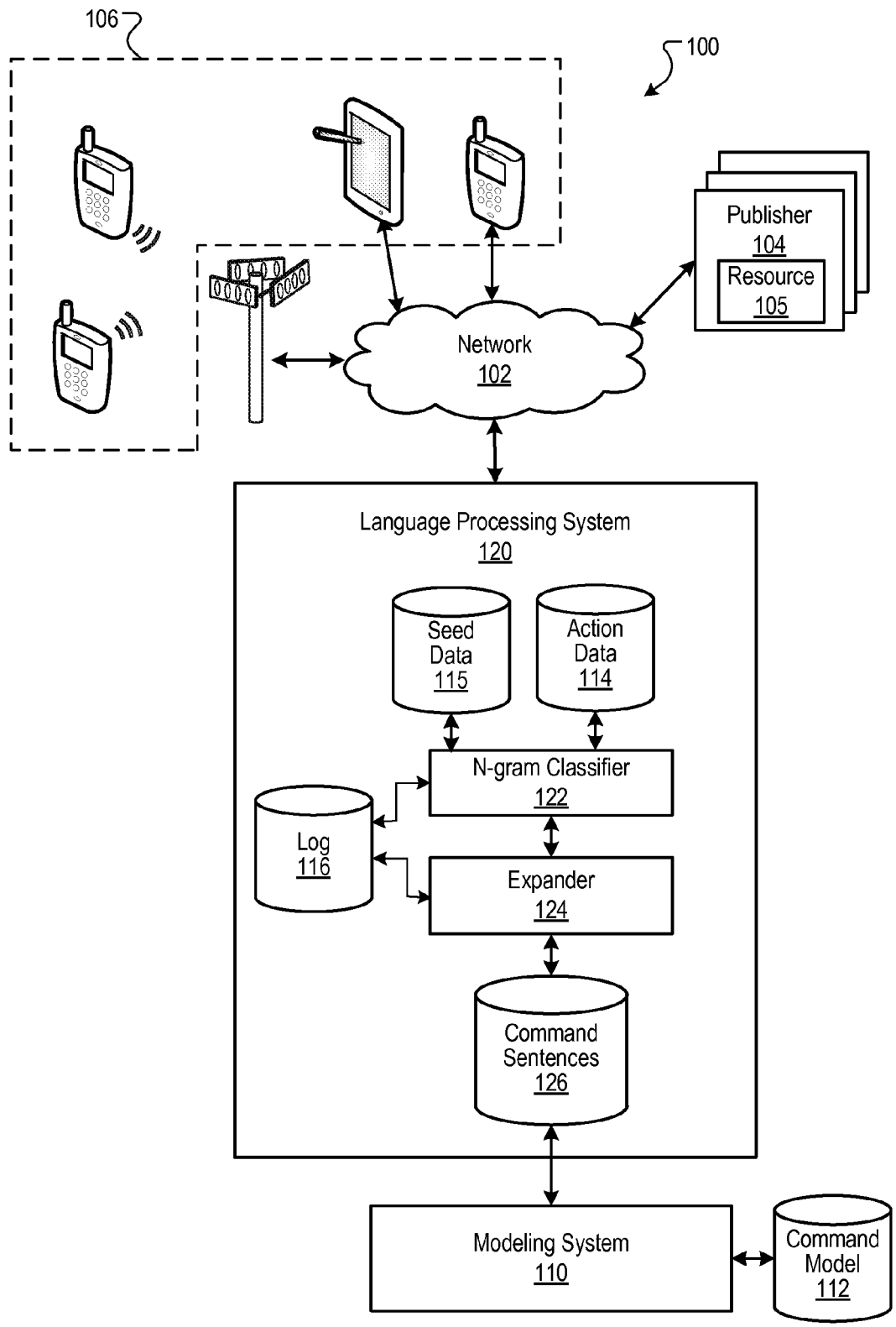
FIG. 1 is a block diagram of an environment in which data for a natural language system are mined.

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and system include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the publisher 104 over the network 102 and that is associated with a resource address.

A user device 106 is an electronic device that is under the control of a user and is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. An example mobile user device 106, such as a smart phone, is described with reference to FIG. 6 below. The user devices 106 may communicate over the networks 102 and 103 by means of wired and wireless connections with the networks 102 and 103.

As described with reference to FIG. 6, a user device may be able to perform a set of device actions for various programs and capabilities. The actions may differ from each other for each action. For example, a telephone functionality may include the action placing a call in response to the commands to "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. In some implementations, the user device 106 utilizes a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action.

A modeling system 130 builds command models 112, which are speech processing models that are provided to user devices 106 and utilized by the user devices 106 to process the speech commands. To build the command models 112, the modeling system 110 needs examples of commands that users will speak for each action. Thus, in some implementations, a language processing system 110 facilitates the building of a robust speech processing model for use in the user devices 106 by selecting command sentences 126 that are used for training the model. The command sentences 126 may include voice commands that have been identified for the particular actions. For example, for the "call" action, the command sentences data 126 may associate a set of voice command inputs for the call action. The voice command inputs may be audio records of the uttered sentences, or, alternatively, may be the words and phrases determined from such voice command inputs.

As will be described in more detail below, the command sentences 126 are, in some implementations, selected from a log 116 of various command sentences. In some implementations, the system 120 begins with a relatively small number of command sentences, referred to as seed data 115. The initial set of command sentences includes command sentences specified for each action, and can, for example, be selected by administrators or selected by a machine learned process. The seed data 115 may be initially selected from the log 116, or input by human supervisors.

Using this seed data 115, the system 120 implements an iterative process that learns a semantic "kernel" of relevant words for each action, and also irrelevant words for each action, starting from the seed data 115 of command sentences for each action. The semantically relevant words and phrases for each action are generally referred to as "first n-grams, and the semantically meaningless words and phrases for each action are generally referred to as "second n-grams." Any appropriate n-gram relevance determination algorithm or process can be used to learn the first and second n-grams.

Using the command sentences and the identified first and second n-grams, the system 120 mines command logs 116 for additional sentences that match the existing sentences and that include an insertion. For example, if the pattern command for an alarm action is "alarm TIME," and the systems has identified the second n-grams "for" and "i need an" as semantically irrelevant for the alarm action, then the sentence "i need an alarm for TIME" is a matching sentence. Additionally, sentences that match just these words and up to a predefined number of additional words that are not identified as semantically irrelevant for an action, and not listed as semantically relevant for any other action, are also identified. These additional words are referred to as third n-grams. For example, "i need an alarm set for TIME" is identified if "set" has not been identified as irrelevant for the action, nor semantically relevant for any action.

The system 120, using the sentences that include the "new" word or phrase (third n-gram), learns whether the third n-gram is likely relevant or irrelevant by examining its usage across all sentences for all actions. If the word is relevant for an action, it is identified as a first n-gram for the action. If the word is not relevant for any action, then it is identified as a second n-gram for all actions. The system can, in some implementations, utilize morphology to help guide relevance. For example, if "call" is a semantically relevant word for an action, the system can assume that "calling" is semantically relevant and mine the sentence that includes this word as being one suitable for the training data for the action.

In some implementations, the highest scoring N semantically irrelevant words and the highest scoring M semantically relevant words for each action are identified. Sentences with these words are displayed to a rater, and the rater accepts or rejects the sentence as a valid command for a specified action. The accepted sentences are added to the training set of command sentences 126, and the process is repeated until a convergence condition (e.g., max number of iterations, a rater indicates the training is complete) occurs. However, the system can be made unsupervised by using a statistical scoring system and automatically accepting sentences that exceed a minimum score based on the constituent n-grams or based on the sentence as a whole.

Figure 2:
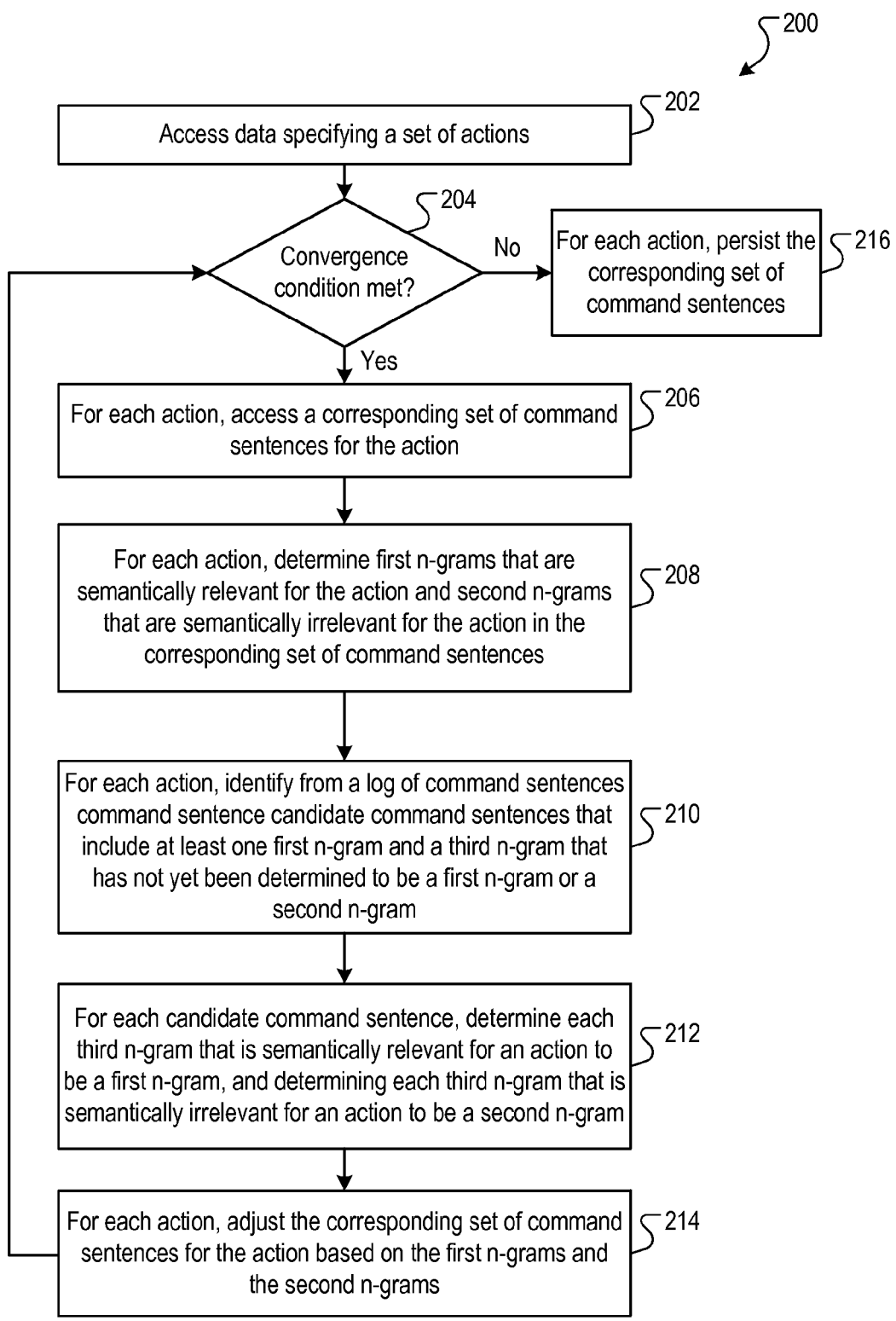
FIG. 2 is a flow diagram of an example process for mining data for a natural language system.

Operation of the language processing system 120 is described with reference to FIG. 2, which is a flow diagram of an example process 200 for mining data for a natural language system. The process 200 can be implemented in a data processing apparatus of one or more computers in data communication, such as a data processing apparatus implementing the language processing system 120.

The language processing system 120 accesses data specifying a set of actions (202). Each action defines a user device operation that is different from user device operations for each other action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command of "accept" or decline," the invitation; a mapping service may include the actions of "mapping" a location in response to the command to "map" a location; and so on.

The language processing system 120 determines if a convergence conditions is met (204). If a convergence condition is not met, then steps (206)-(214) are iteratively performed. During a first iteration, the convergence condition is not met, and thus the process 200 continues to step (206). As described above, a maximum number of iterations, or a rater indicating the training is complete, are examples of convergence conditions being met. However, any appropriate convergence condition can be used.

For each iteration, the language processing system 120 accesses, for each action, a corresponding set of command sentences for the action (206). For example, for a "call" action, command sentences specific to the action are accessed. Likewise, for a "text" action, command sentences for the text action are accessed. During the first iteration, the command sentences in the seed data 115 are specified for each action. During subsequent iterations, as will be described below, additional command sentences that have been selected for each action are also accessed.

For each action, the language processing system 120 determines first n-grams that are semantically relevant for the action and second n-grams that are semantically irrelevant for the action in the corresponding set of command sentences (208). A variety of appropriate algorithms can be used to learn the semantically irrelevant and semantically relevant n-grams. Examples include support vector machines, and mutual information. The algorithm can be implemented as an n-gram classifier 122. For a support vector machine, the n-gram classifier accesses the seed data 115 and action data 114 and determines whether the n-gram is a first n-gram or a second n-gram by classifying the n-gram according to a support vector model that has been trained to classify n-grams as being relevant or irrelevant to particular actions. For mutual information, the n-grams with the relatively highest point wise mutual information (PMI) scores for a particular action can be classified as first n-grams, while the n-grams with the relative lowest PMI scores for a particular action can be classified as second n-grams. Other appropriate language relevance determination processes can also be used.

For each action, the language processing system 120 identifies from a log of command sentences that includes command sentences not included in the corresponding set of command sentences candidate command sentences that include at least one first n-gram and a third n-gram that has not yet been determined to be a first n-gram or a second n-gram (210). In some implementations, the third n-gram is any n-gram that has not been identified as irrelevant for the action, nor semantically relevant for any action. For example, as described above, if the pattern command for an action is "alarm TIME," and the language processing system has identified the second n-grams "for" and "I need an" as semantically irrelevant, then the sentence "I need an alarm for TIME" is a matching sentence that does not include a third n-gram.

However, sentences that match just these words and that include at least one third n-gram are also identified. For example, "i need an alarm set for TIME" is identified if "set" is a third n-gram that has not been identified as irrelevant for the action, nor semantically relevant for any action. Conversely, assume the n-gram "message" has been identified as semantically relevant for a "text" action. Then the sentence "i need an alarm message for TIME" would not result in the n-gram "message" being identified as a third n-gram, as the n-gram has already been identified as semantically relevant for the "text" action. Thus, the sentence "i need an alarm message for TIME" would also not be identified, as it does not include a third n-gram that has not yet been determined to be a first n-gram or a second n-gram. To determine whether a sentence includes a third n-gram, the n-gram classifier 122 accesses data stored in the command sentences 116 that describes the first and second n-grams for each action. From the first and second n-grams, the n-gram classifier can determine whether a sentence from the log 116 also includes a third n-gram for an action, i.e., an n-gram that not been identified as irrelevant for the action, nor semantically relevant for any action.

For each candidate command sentence, the language processing system 120 identifies each third n-gram that is semantically relevant for an action as a first n-gram, and identifies each third n-gram that is semantically irrelevant for all action as a second n-gram (212). As with step (208), a variety of appropriate algorithms can be used to learn the semantically irrelevant and semantically relevant third n-grams, e.g., a support vector machine, pairwise mutual information, etc. For example, for the sentence "i need an alarm set for TIME," the n-gram classifier may identify the n-gram "set" as a first n-gram. This may occur, for example, when the n-gram "set" is included in other first sentences, e.g., "set an alarm for TIME," "set alarm for TIME," etc.

For each action, the language processing system 120 adjusts the corresponding set of command sentences for the action based on the first n-grams and the second n-grams (214). For example, during the first iteration, each of the sentences in the seed data 114 are added to the command sentences 126, and a subset of the candidate command sentence that includes only first and second n-grams are also added to the command sentences. For example, a subset of the candidate command sentences are added to the command sentences initially provided in the seed data 115 based on an appropriate ranking and selection process. Examples of such ranking and selection processes are described with reference to FIGS. 3-5 below. The processes of selecting additional sentences can be handled, for example, by an expander 124. The expander 124 may implement a machined learned process or, alternatively, may implement a supervised process that carries out the processed described in FIGS. 3-5.

The language processing system 120 then again determines if the convergence condition is met (204). In response to the convergence condition being met, the language processing system 120 persists, for each action, the corresponding set of command sentences to form a set of command sentences 126 (216). Conversely, if the convergence condition is not met, another iteration is performed.

Once the process 200 is complete, the persisted command sentences can be used in a variety of data processing operations. One example of such a data processing operation is model training to generate command models 132 for actions. The user device 106 utilizes the command models to determine which, if any, actions are invoked in response to a voice input. The command models may be statistical-based, e.g., weights assigned to particular words and phrases that are determined to be semantically relevant to a particular command, or rule-based, e.g., grammars that describe sentence structures for particular commands. Any appropriate process can be used to build the command models from the persisted command sentences 126.

As described above, the expander 124 selects command sentences that include at least one third n-gram. In some implementations, the third n-grams are unigrams, and the candidate command sentences that are selected can only include one unigram; that is, each candidate sentence is a sentence that includes only first and second n-grams and only one third n-gram that has not yet been determined to be a first or second n-gram. For example, the sentence "i need an alarm set for TIME" would be selected as the only third n-gram is "set," and the remainder of the sentence is composed of first and second n-grams. Now assume the sentence "i need an alarm set to go off at TIME" is processed, and the terms "to," "go," "off" and "at" are identified as third n-grams. This sentence would not be selected, as there are four third unigrams "to," "go," "off" and "at." In other implementations, the sentences that are selected can include more than one third n-gram, and the n-grams may include unigrams, bi-grams, tri-grams, etc.

Figure 3:
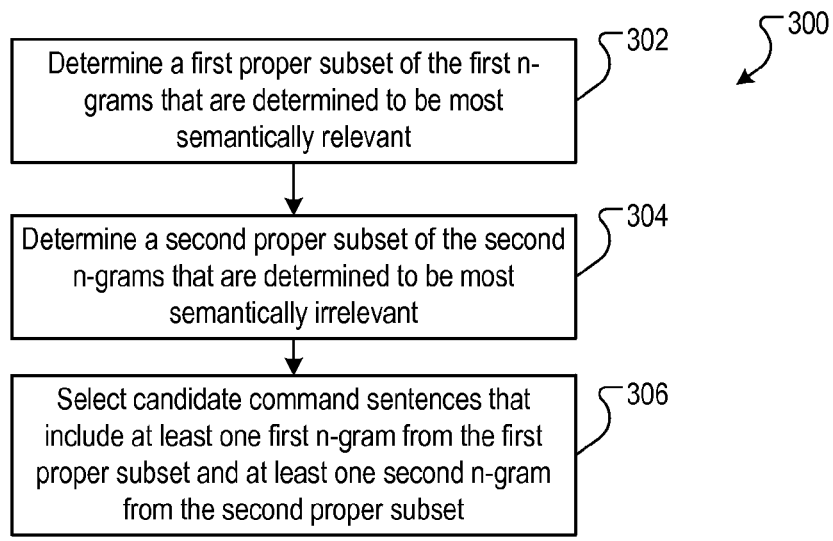
FIG. 3 is a flow diagram of an example process for selecting command sentences from candidate command sentences.

FIG. 3 is a flow diagram of an example process 300 for selecting command sentences from candidate command sentences. The process 300 can be implemented in a data processing apparatus of one or more computers in data communication, such as a data processing apparatus implementing the language processing system 120. The process 300 selects sentences from the candidate sentences based on the rankings of n-grams within the sentences.

The expander 124 determines a first proper subset of the first n-grams that are determined to be most semantically relevant (302). For example, using an appropriate relevance scoring process, the expander 124 ranks the n-grams according to corresponding highest relevance scores. One example relevance score is a mutual information score.

The language processing system 120 determines a second proper subset of the second n-grams that are determined to be most semantically irrelevant (304). For example, the expander 124, using the appropriate relevance scoring process, ranks the n-grams according to corresponding lowest relevance scores.

The language processing system 120 selects candidate command sentences that include at least one first n-gram from the first proper subset and at least one second n-gram from the second proper subset (306). For example, the expander may select only the candidate sentences that include one first n-gram from the first proper subset and one second n-gram from the second proper subset. Alternatively, the expander 124 may select candidate sentences that include one first n-gram from the first proper subset and candidate sentences that include one n-gram from the second proper subset.

Figure 4:
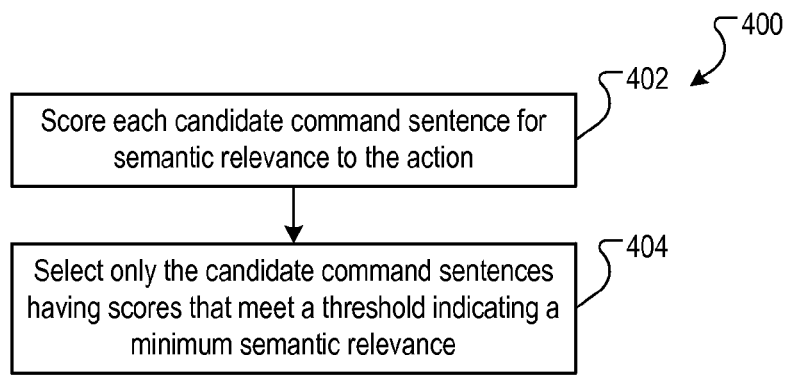
FIG. 4 is a flow diagram of another example process for selecting command sentences from candidate command sentences.

FIG. 4 is a flow diagram of another example process 400 for selecting command sentences. The process 400 can be implemented in a data processing apparatus of one or more computers in data communication, such as a data processing apparatus implementing the language processing system 120. The process 400 selects sentences from candidate sentences based on a score that measures the semantic relevance of a sentence to an action.

The language processing system 120 scores each candidate command sentence for semantic relevance to the action (402). For example, the expander 124 generates a relevance score for each sentence that is a measure of the semantic relevance of the sentence to the action. Thus, instead of scoring on the n-grams of a sentence, the entire structure of the sentence is taken into account when ranking each sentence.

The language processing system 120 selects only the candidate command sentences having scores that meet a threshold indicating a minimum semantic relevance (404). The threshold may be an actual threshold score, or, alternatively, may be a floating threshold that selects only the top N sentences, or some other appropriate threshold for determining a minimum semantic relevance.

Figure 5:
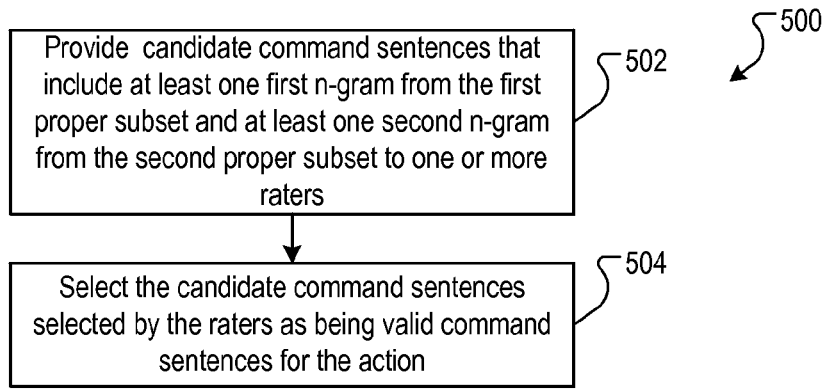
FIG. 5 is a flow diagram of another example process for selecting command sentences from candidate command sentences.

FIG. 5 is a flow diagram of another example process for selecting command sentences. The process 500 can be implemented in a data processing apparatus of one or more computers in data communication, such as a data processing apparatus implementing the language processing system 120. The process 500 is a supervised process that includes human rater intervention.

The language processing subsystem 120 provides candidate command sentences that include at least one first n-gram from the first proper subset and at least one second n-gram from the second proper subset to one or more raters (502). For example, using an appropriate relevance scoring process, the expander 124 ranks the n-grams according to corresponding highest relevance scores and lowest relevance scores, and selects sentences that include at least one each of the first and second n-grams for presentation to raters.

The language processing subsystem 120 selects the candidate command sentences selected by the raters as being valid command sentences for the action (504). For example, the raters may select which of the presented sentences are actually relevant for a given action. These selected sentences are then persisted to the command sentences 126.

Variations of the examples described above can also be implemented. For example, while n-grams have been described in the context of single words, or multiple words or phrase, the n-grams can also be lexical units. For English, a lexical unit may be a word, a prefix, a stem, or even a suffix. For languages that use ideographic writing systems, e.g., Japanese and Chinese, a lexical unit may be a pictographic character, e.g. Kangii, Katakana, Hirigana characters. For example, the system might learn that a word stem is semantically relevant and include it in the first n-grams. However, the prefix and suffix might be determined to belong to the second set of n-grams, thus allowing generalizations of sentences from one verb form to another, or singular nouns to plural nouns, etc.

FIG. 6 is a block diagram of example mobile computing device. In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, select-able graphical interface elements further or alternatively correspond to a button on the keyboard 604. User-selection of the button may invoke the pre-defined action.

The mobile computing device 610 may include other applications, computing sub-systems, and hardware. A voice recognition service 672 may receive voice communication data received by the mobile computing device's microphone 622, and translate the voice communication into corresponding textual data or perform voice recognition. The processed voice data can be input to the command models stored in the command models data 132 to determine whether the voice input used to generate the voice data invokes a particular action for a particular application. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 610 to the network 650 to enable communication between the mobile computing device 610 and other computing systems that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing systems associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call using a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program.

Mapping service 680 can provide the mobile computing device 610 with street maps, route planning information, and satellite images. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, comprising:
    accessing data specifying a set of actions, each action defining a user device operation that is different from user device operations for each other action;
    iteratively processing data for the set of actions until a convergence condition is met, the iterative processing comprising:
        for each action, accessing a corresponding set of command sentences for the action;
        for each action, determining first n-grams that are semantically relevant for the action and second n-grams that are semantically irrelevant for the action in the correspond set of command sentences;
        for each action, identifying, from a log of command sentences that includes command sentences not included in the corresponding set of command sentences, candidate command sentences that include at least one first n-gram and a third n-gram that has not yet been determined to be a first n-gram or a second n-gram;
        for each candidate command sentence, determining each third n-gram that is semantically relevant for an action to be a first n-gram, and determining each third n-gram that is semantically irrelevant for an action to be a second n-gram; and
        for each action, adjusting the corresponding set of command sentences for the action based on the first n-grams and the second n-grams; and
    in response to the convergence condition being met, persisting in a computer memory device, for each action, the corresponding set of command sentences.

2. The method of claim 1, wherein for each action, adjusting the corresponding set of command sentences for the action based on the first n-grams and the second n-grams comprises:
    determining a first proper subset of the first n-grams that are determined to be most semantically relevant;
    determining a second proper subset of the second n-grams that are determined to be most semantically irrelevant; and
    selecting candidate command sentences that include at least one first n-gram from the first proper subset and at least one second n-gram from the second proper subset.

3. The method of claim 2, wherein selecting candidate command sentences that include at least one first n-gram from the first proper subset and at least one second n-gram from the second proper subset comprises:
    scoring each candidate command sentence for semantic relevance to the action; and
    selecting only the candidate command sentences having scores that meet a threshold indicating a minimum semantic relevance.

4. The method of claim 2, wherein selecting candidate command sentences that include at least one first n-gram from the first proper subset and at least one second n-gram from the second proper subset comprises:
    providing candidate command sentences that include at least one first n-gram from the first proper subset and at least one second n-gram from the second proper subset to one or more raters; and
    selecting the candidate command sentences selected by the raters as being valid command sentences for the action.

5. The method of claim 2, wherein identifying candidate command sentences that include at least one first n-gram and a third n-gram that has not yet been determined to be a first n-gram or a second n-gram comprises identifying candidate command sentences that include at least one first n-gram and only one third n-gram.

6. The method of claim 5, wherein the third n-gram is a unigram.

7. The method of claim 1, wherein the command sentences are voice command sentences.

8. A non-transitory computer readable storage medium storing instructions executable by a data processing apparatus and upon such execution cause the data processing to perform operations comprising:
    accessing data specifying a set of actions, each action defining a user device operation that is different from user device operations for each other action;
    iteratively processing data for the set of actions until a convergence condition is met, the iterative processing comprising:
        for each action, accessing a corresponding set of command sentences for the action;
        for each action, determining first n-grams that are semantically relevant for the action and second n-grams that are semantically irrelevant for the action in the correspond set of command sentences;
        for each action, identifying, from a log of command sentences that includes command sentences not included in the corresponding set of command sentences, candidate command sentences that include at least one first n-gram and a third n-gram that has not yet been determined to be a first n-gram or a second n-gram;
        for each candidate command sentence, determining each third n-gram that is semantically relevant for an action to be a first n-gram, and determining each third n-gram that is semantically irrelevant for an action to be a second n-gram; and
        for each action, adjusting the corresponding set of command sentences for the action based on the first n-grams and the second n-grams; and
    in response to the convergence condition being met, persisting in a computer memory device, for each action, the corresponding set of command sentences.

9. The non-transitory computer storage medium of claim 8, wherein for each action, adjusting the corresponding set of command sentences for the action based on the first n-grams and the second n-grams comprises:
   determining a first proper subset of the first n-grams that are determined to be most semantically relevant;
   determining a second proper subset of the second n-grams that are determined to be most semantically irrelevant; and
   selecting candidate command sentences that include at least one first n-gram from the first proper subset and at least one second n-gram from the second proper subset.

10. The non-transitory computer storage medium of claim 9, wherein selecting candidate command sentences that include at least one first n-gram from the first proper subset and at least one second n-gram from the second proper subset comprises:
   scoring each candidate command sentence for semantic relevance to the action; and
   selecting only the candidate command sentences having scores that meet a threshold indicating a minimum semantic relevance.

11. The non-transitory computer storage medium of claim 9, wherein selecting candidate command sentences that include at least one first n-gram from the first proper subset and at least one second n-gram from the second proper subset comprises:
   providing candidate command sentences that include at least one first n-gram from the first proper subset and at least one second n-gram from the second proper subset to one or more raters; and
   selecting the candidate command sentences selected by the raters as being valid command sentences for the action.

12. The non-transitory computer storage medium of claim 9, wherein identifying candidate command sentences that include at least one first n-gram and a third n-gram that has not yet been determined to be a first n-gram or a second n-gram comprises identifying candidate command sentences that include at least one first n-gram and only one third n-gram.

13. The non-transitory computer storage medium of claim 12, wherein the third n-gram is a unigram.

14. A system, comprising:
   a data processing apparatus; and
   a non-transitory computer readable storage medium in data communication with the data processing apparatus and storing instructions executable by the data processing apparatus and upon such execution cause the data processing to perform operations comprising:
   accessing data specifying a set of actions, each action defining a user device operation that is different from user device operations for each other action;
   iteratively processing data for the set of actions until a convergence condition is met, the iterative processing comprising:
      for each action, accessing a corresponding set of command sentences for the action;
      for each action, determining first n-grams that are semantically relevant for the action and second n-grams that are semantically irrelevant for the action in the correspond set of command sentences;
      for each action, identifying, from a log of command sentences that includes command sentences not included in the corresponding set of command sentences, candidate command sentences that include at least one first n-gram and a third n-gram that has not yet been determined to be a first n-gram or a second n-gram;
      for each candidate command sentence, determining each third n-gram that is semantically relevant for an action to be a first n-gram, and determining each third n-gram that is semantically irrelevant for an action to be a second n-gram; and
      for each action, adjusting the corresponding set of command sentences for the action based on the first n-grams and the second n-grams; and
   in response to the convergence condition being met, persisting in a computer memory device, for each action, the corresponding set of command sentences.

15. The system of claim 14, wherein for each action, adjusting the corresponding set of command sentences for the action based on the first n-grams and the second n-grams comprises:
   determining a first proper subset of the first n-grams that are determined to be most semantically relevant;
   determining a second proper subset of the second n-grams that are determined to be most semantically irrelevant; and
   selecting candidate command sentences that include at least one first n-gram from the first proper subset and at least one second n-gram from the second proper subset.

16. The system of claim 15, wherein selecting second candidate command sentences that include at least one first n-gram from the first proper subset and at least one second n-gram from the second proper subset comprises:
   scoring each candidate command sentence for semantic relevance to the action; and
   selecting only the candidate command sentences having scores that meet a threshold indicating a minimum semantic relevance.

17. The system of claim 15, wherein selecting candidate command sentences that include at least one first n-gram from the first proper subset and at least one second n-gram from the second proper subset comprises:
   providing candidate command sentences that include at least one first n-gram from the first proper subset and at least one second n-gram from the second proper subset to one or more raters; and
   selecting the candidate command sentences selected by the raters as being valid command sentences for the action.

18. The system of claim 15, wherein identifying candidate command sentences that include at least one first n-gram and a third n-gram that has not yet been determined to be a first n-gram or a second n-gram comprises identifying candidate command sentences that include at least one first n-gram and only one third n-gram.

* * * * *